(12) United States Patent
Johnson et al.

(10) Patent No.: US 9,094,394 B2
(45) Date of Patent: Jul. 28, 2015

(54) MANAGING CROSS-PREMISES RESOURCES THROUGH INTEGRATED VIEW

(75) Inventors: Warren Johnson, Beijing (CN); Hong Chen, Beijing (CN); Feng Wang, Redmond, WA (US); Jiuqing Song, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 697 days.

(21) Appl. No.: 13/355,789

(22) Filed: Jan. 23, 2012

(65) Prior Publication Data

US 2013/0191538 A1 Jul. 25, 2013

(51) Int. Cl.
*G06F 15/173* (2006.01)
*H04L 29/06* (2006.01)

(52) U.S. Cl.
CPC .................................. *H04L 63/0815* (2013.01)

(58) Field of Classification Search
None
See application file for complete search history.

(56) References Cited

U.S. PATENT DOCUMENTS

| | | | |
|---|---|---|---|
| 7,228,351 B2 | 6/2007 | Arwe | |
| 8,010,629 B2 | 8/2011 | Lanahan et al. | |
| 2003/0115550 A1* | 6/2003 | Womble et al. | 715/517 |
| 2005/0038868 A1* | 2/2005 | Spicer | 709/217 |
| 2005/0216569 A1* | 9/2005 | Coppola et al. | 709/213 |
| 2009/0198835 A1 | 8/2009 | Madhusudanan et al. | |
| 2009/0249439 A1 | 10/2009 | Olden et al. | |
| 2010/0088414 A1 | 4/2010 | Lin et al. | |
| 2011/0154462 A1* | 6/2011 | Charbonnier et al. | 726/7 |
| 2011/0214124 A1 | 9/2011 | Ferris et al. | |
| 2012/0324365 A1* | 12/2012 | Momchilov et al. | 715/738 |
| 2013/0247155 A1* | 9/2013 | Boulos et al. | 726/4 |

OTHER PUBLICATIONS

"Cross-domain Single Sign-On Solutions", Retrieved at <<http://publib.boulder.ibm.com/tividd/td/ITAME/SC32-1134-01/en_US/HTML/amweb41_admin09.htm>>, Retrieved Date: Dec. 9, 2011, pp. 18.
Kusnetzky, Dan, "Abiquo Enterprise Cloud Management", Retrieved at <<http://www.abiquo.com/files/Brochure1.7_hi-res.pdf>>, Apr. 4, 2011, pp. 6.
Gilham, John, "Lync On-Premise Integration and Federation with Exchange Online (Office 365) Unified Messaging via SIP", Retrieved at <<http://www.agileit.com/Blog/Lists/Posts/Post.aspx?ID=866>>, Jun. 27, 2011, pp. 11.

* cited by examiner

*Primary Examiner* — Melvin H. Pollack
*Assistant Examiner* — Oluwatosin Gidado
(74) *Attorney, Agent, or Firm* — Louise Bowman; Jim Ross; Micky Minhas

(57) ABSTRACT

A communication application manages cross-premises resources through an integrated view. The application creates a single view to manage local and remote resources by modeling the single view. The application manages the local and remote resources from the single view. The application transmits and receives input/output from the local and remote resources. Output is displayed in the single view. The application also secures cross-premises messaging and signaling across the local and remote resources. The application secures messaging and signaling by implementing security requirements of the resources. In addition, the application provides a single sign on (SSO) authentication across the local and remote resources.

19 Claims, 11 Drawing Sheets

MANAGING CROSS-PREMISES RESOURCES THROUGH INTEGRATED VIEW

BACKGROUND

System management of local server resources and remotely hosted resources can be challenging and necessitate substantial information technology (IT) support. In addition, third-party servers co-located in separate datacenters usually require unique and distinct server configurations. Current multi-platform management solutions rarely meet system management challenges of broad and varied installations. Conventional solutions provide tools that are rarely connected and lack features to support collaboration.

In conventional approaches, deployments, local and remote server resources, are typically managed individually. Deployments cannot share data, resources or communicate automatically without extensive manual intervention by an administrator via separate non-connected system management tools. Varying deployment components do not share common authentication mechanisms or system logon credentials. In essence, components are completely distinct server deployments acting only independently. A physical organization usually requires management of a collective pool of employees or users, often spanning across on-premises and Internet located resources (e.g. cross-premises) especially in the case of highly complex large organizations. In the context of the single physical organization (e.g. company), a pattern of unrelated individual management of separate premise resources creates a high management overhead. The overhead encapsulates manually synchronizing the configuration datasets and users when spanned by the organization in addition to any previous capital expenditures on actual software and hardware.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to managing cross-premises resources through an integrated view. According to some embodiments, a communication application may model local and remote resources into a single view. The local and remote resources may provide managerial functionality that may be consolidated by the communication application. The application may manage the local and remote resources from the single view. Functionality in common with local and remote resources may be managed by integrated controls within the single view. The application may secure cross-premises messaging and signaling across the local and remote resources. The application may encrypt and/or authenticate communication modalities according to the local and remote resource requirements. In addition, the application may provide single sign-on (SSO) authentication across the local and remote resources. The application may automate authentication through a single access point for multiple platforms.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
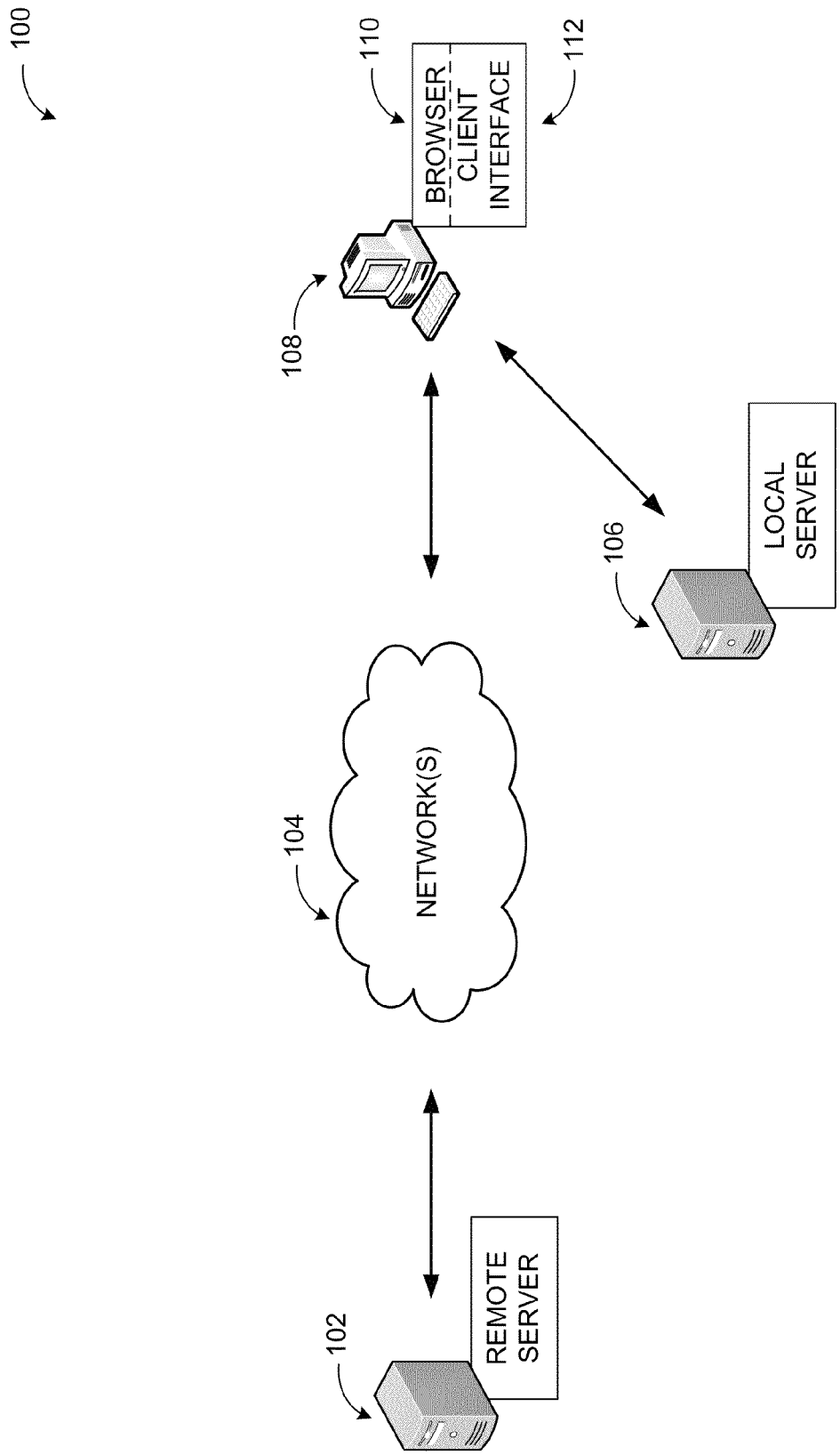
FIG. 1 illustrates a networked environment, where a communication application may manage cross-premises resources through an integrated view according to some embodiments.

As briefly described above, a communication application may manage cross-premises resources through an integrated view. As discussed above, the application may model local and remote resources into a single view. The single view may be a web page integrating web pages displayed by local and remote resources. The web page may be displayed in a web browser. The application may manage the local and remote resources from the single view. The application may accept user input through the single view and transmit corresponding inputs to the local and remote resources. The application may secure cross-premises messaging and signaling across the local and remote resources. The application may implement security measures as required by the local and remote resources to transmit input from and output into the single view. In addition, the application may provide single sign on (SSO) authentication across the local and remote resources. The application may provide a single access point to authenticate a user for multiple resources. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

Cross-premises resources may include local and remote resources. An example local resource may be an intranet web service provider. Another example local resource may include a local email server. A communication application may integrate the local resource presentation layer with the presentation layer of remote resources and present to a user as an integrated view. The integrated view may be a browser window displaying common controls for the local and remote resources. The remote resources may include web services, email servers, and other service providers. The communication application may be a local application residing within a client platform. In an example platform, the communication application may be a component of a web browser.

Throughout this specification, the term "platform" may be a combination of software and hardware components for managing cross-premises resources through an integrated view. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates a networked environment, where a communication application may manage cross-premises resources through an integrated view according to some embodiments. The computing devices and computing environments shown in diagram 100 are for illustration purposes. Embodiments may be implemented in various local, networked, cloud-based and similar computing environments employing a variety of computing devices and systems, hardware and software.

In an example environment illustrated in diagram 100, a client interface 112 (e.g. a browser 110) executed on client device 108 may display an integrated view provided by a communication application. The integrated view may display features and functionality in common between services provided by remote server 102 and local server 106. The application may receive input through the integrated view and transmit the input to remote server 102 through network(s) 104. The application may also transmit input received within the integrated view to the local server 106. The transmitted input may manage the remote server 102 and local server 106. The application may also receive output from the remote server 102 and local server 106 servers. The application may integrate the output and display in the integrated view in a communication application such as a web browser 110.

Figure 2:
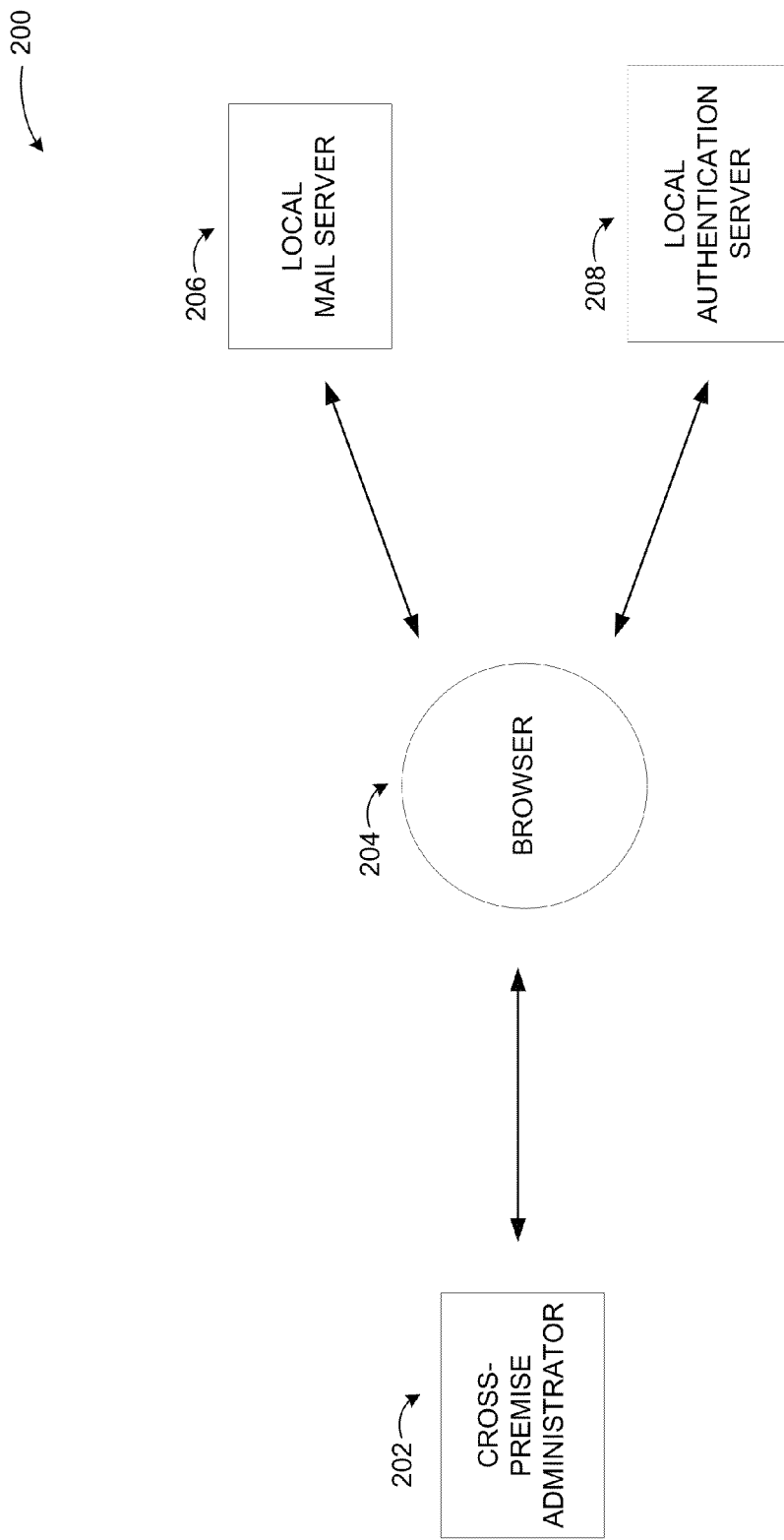
FIG. 2 illustrates an example component diagram of a communication application managing local resources through an integrated view according to embodiments.

FIG. 2 illustrates an example component diagram of a communication application managing local resources through an integrated view according to embodiments. Diagram 200 displays a browser 204 presenting an integrated view for a cross-premises administrator 202. The integrated view may be displayed within a web browser as discussed above.

The browser 204 may be the communication application integrating output from the local mail server 206 and local authentication server 208. The browser 204 may display common controls and differentiating functionality through the integrated view. The browser may transmit any input by the cross-premises administrator 202 to corresponding resource such as local mail server 206 and the local authentication server 208. The transmission formatting may be according to communication interface determined according to standards used in communication between the browser 204 and local resources (206 and 208). Alternatively, the transmission may be formatted according to predetermined system settings such as configuration mappings.

Figure 3:
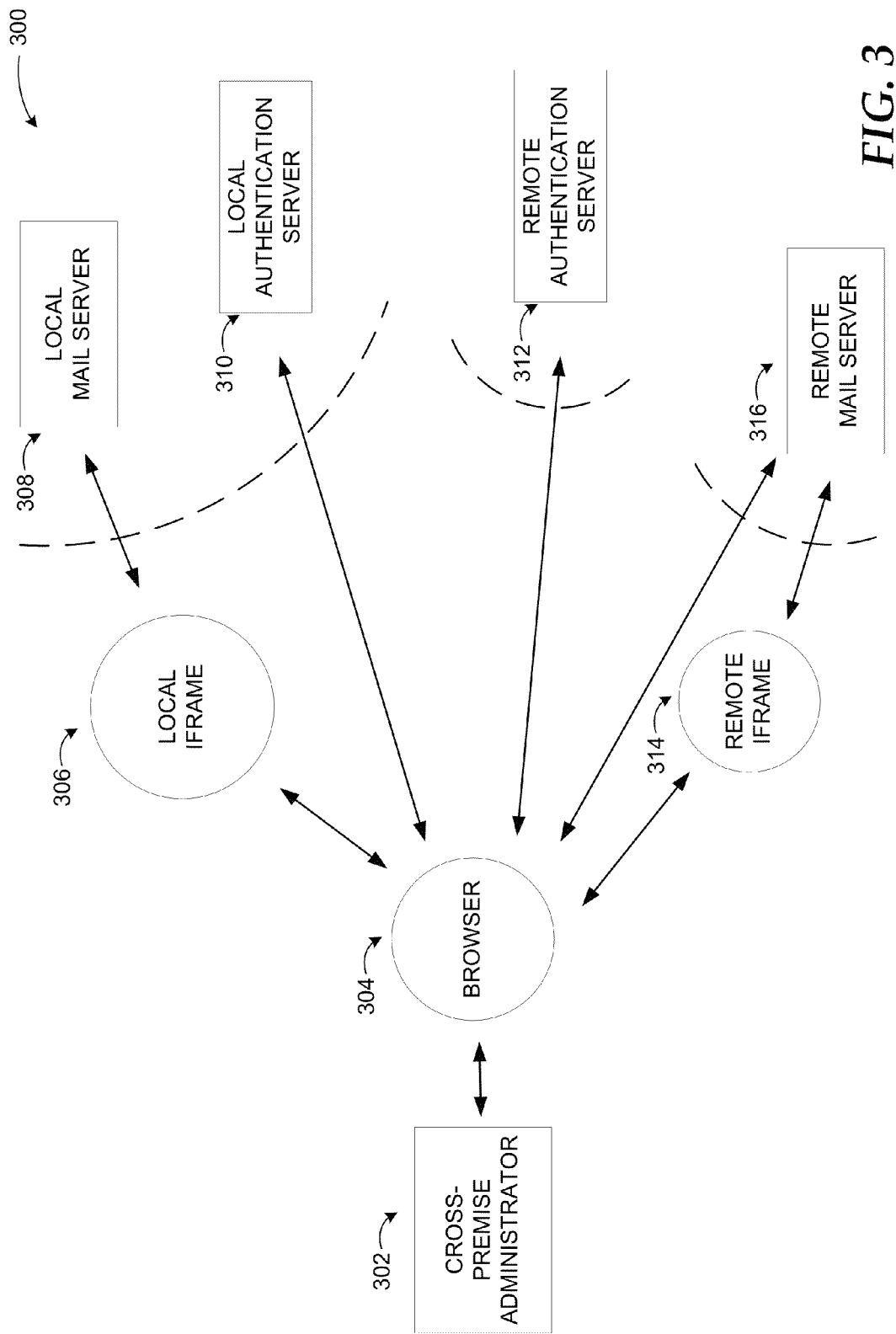
FIG. 3 illustrates another example component diagram of a communication application managing local and remote resources through an integrated view according to embodiments.

FIG. 3 illustrates another example component diagram of a communication application managing local and remote resources through an integrated view according to embodiments. Diagram 300 displays a browser 304 consolidating input/output into/from local and remote resources for presentation to a cross-premises administrator 302.

In an example scenario, the browser 304 may use a local iframe 306 to format input/output into/from a local mail server 308. The iframe may be an inline frame to be embedded into a web page displayed by the browser to manage the local mail server 308. Additionally, the browser 304 may format input from cross-premises administrator 302 according to the local iframe 306 configuration settings. The configuration settings may match the local mail server's input formatting. The local mail server 308 may receive the formatted local iframe 306 and process the input. Alternatively, the browser 304 may communicate directly with a local resource such as a local authentication server 310. The browser may authenticate a user such as cross-premises administrator 302 through services provided by the local authentication server 310.

In another scenario, the browser may transmit input provided by the cross-premises administrator into the integrated view displayed by the browser 304 to a remote authentication server 312. The browser may provide the same input provided to the local authentication server 310 to the remote authentication server 312 in order to authenticate the same user through a single point of access for multiple platforms.

In yet another scenario, the communication application such as browser 304 may use a remote web browser iframe 314 for input/output formatting. The browser may utilize the intermediary remote iframe 314 to interact with the remote mail server 316. Alternatively, the browser may communicate the remote mail server 316 directly.

While some embodiments are described using specific implementation details such as iframes, they are not limited to iframe, HTML, or similar specific examples. Embodiments may be implemented using any web presentation technology as well as a mix of any of these technologies employed by each premise to be managed using the principles described herein.

Figure 4:
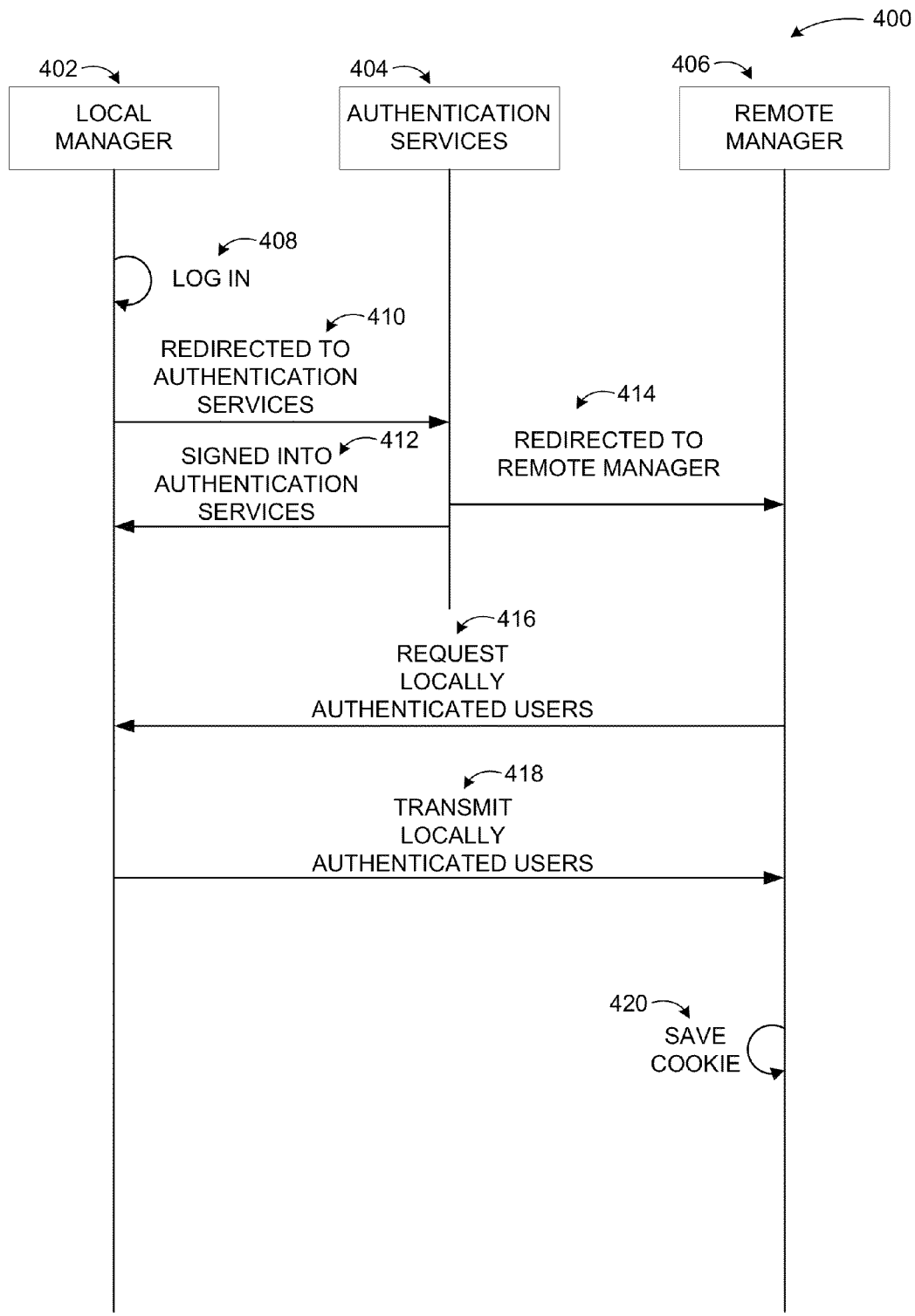
FIG. 4 illustrates a sequence diagram presenting integrated authentication for local and remote resources according to embodiments.

FIG. 4 illustrates a sequence diagram presenting integrated authentication for local and remote resources according to embodiments. A user may log in 408 to a local manager service 402. A communication application within the local manager service 402 may redirect 410 the log in to authentication services 404. The authentication services may sign the user into the authentication services 412. The authentication services 404 may also redirect the authentication request 414 to remote manager 406 services. The remote manager 406 services may also authenticate the user enabling the user to log in to multiple platforms by log in to only the local manager service 402.

Additionally, the remote manager may request a list of locally authenticated users 416 from the local manager service 402. The communication application running as the local manager service 402 may transmit the locally authenticated users 418 to the remote manager 406 services. The remote manager 406 services may update authenticated users according to the received list. The remote manager 406 services may persist the authenticated users by saving a cookie 420 referencing the authentication.

Figure 5:
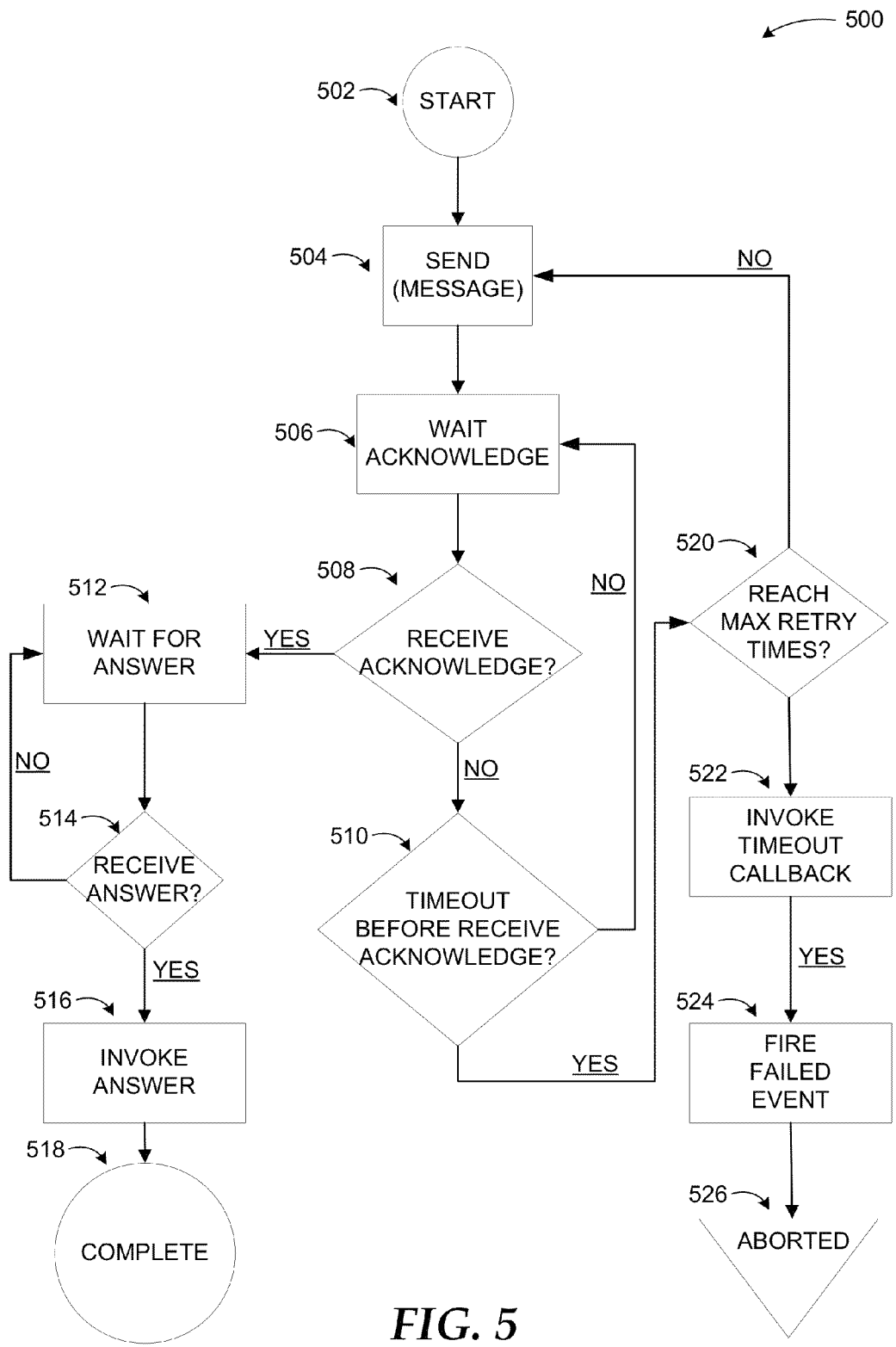
FIG. 5 illustrates a decision diagram for a process to manage cross-premises resources through an integrated view according to embodiments.

FIG. 5 illustrates a decision diagram for a process to manage cross-premises resources through an integrated view according to embodiments. In diagram 500, process to manage cross-premises resources starts at step 502. At step 504, the communication application sends a message to a resource. The application waits for an acknowledgement at step 506. Upon determining whether the acknowledgement is received or not at decision node 508, the application may wait for an answer at step 512. Upon determining whether the answer is received or not at decision node 514, the application may invoke a counter answer at step 516. Upon invoking the answer, the application may complete 518 the communication with the resource. Alternatively, the application may return to wait for answer step 512, upon a negative determination to answer received at decision node 514.

At decision node 510, the application may determine whether a timeout has been reached before receiving acknowledgement upon a negative determination of receiving acknowledgement. Upon a negative determination, the application may return to wait for acknowledgement step 506. Upon a positive determination, the application may determine whether max retry times was reached at decision node 520. Upon a negative determination of max retry times was reached, the application may return to send a message at step 504. Upon a positive determination, the application may invoke a timeout callback 522. And, the application may fire a failed event 524 notification. Finally, the application may abort 526 the communication.

According to embodiments, the local and remote resources may include unique views and communication layers. An example may be local and remote web services providing web based applications communicating through encrypted html protocols. Additionally, the single view may include multiple integrated web pages from the local and remote resources displayed in browser windows.

According to other embodiments, the application may employ a cross-site communication logic to support messaging and signaling across the local and remote resources. In response to accepting a message parameter from a local resource, the cross-site communication logic may transmit the message parameter to an associated remote resource. Alternatively, in response to accepting a message parameter from a remote resource, the cross-site communication logic may transmit the message parameter to an associated local resource.

According to yet other embodiments, the application may store a message until detection of a feedback or a message time-out event indicating a communication attempt failure.

Figure 6A:
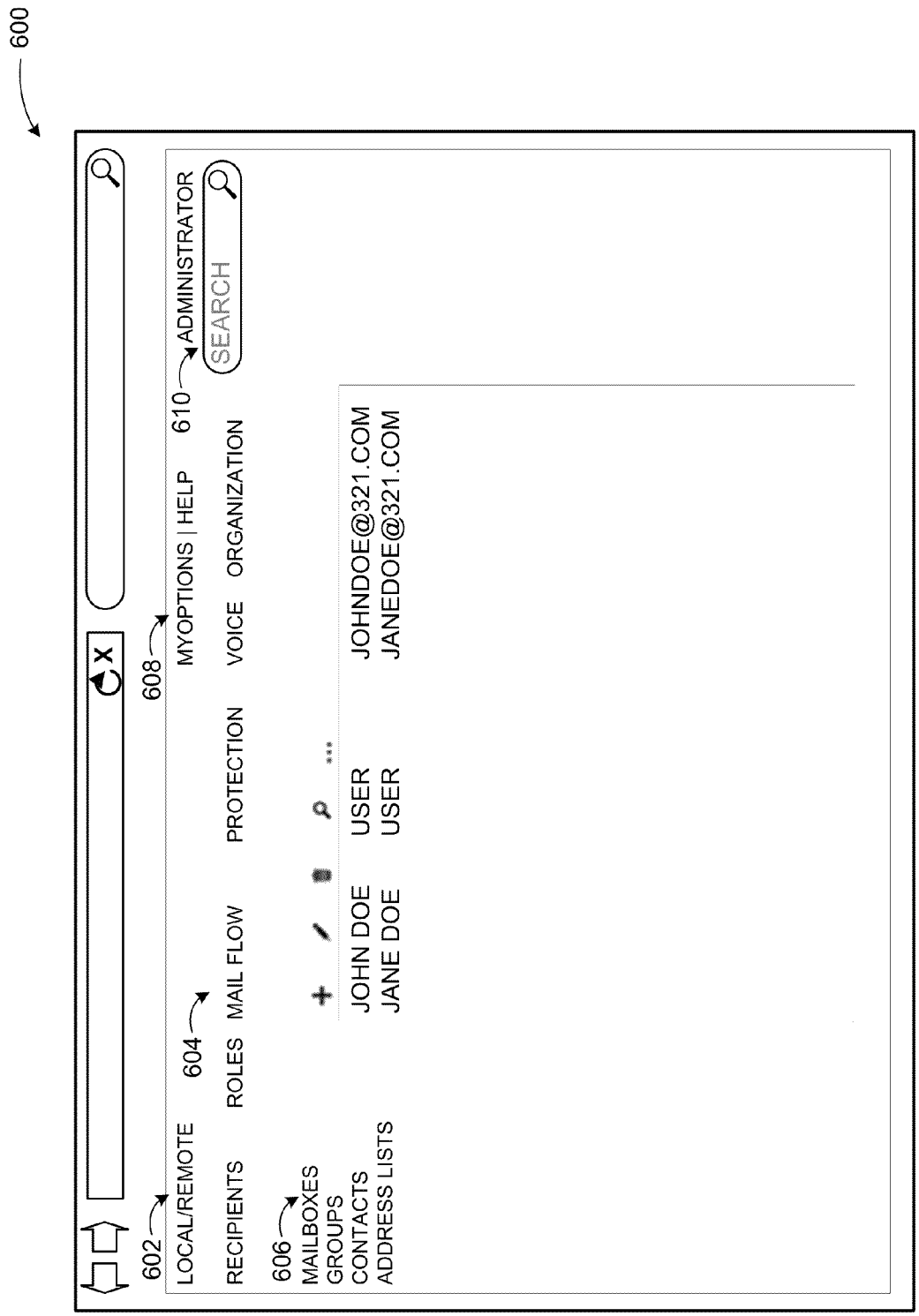
FIG. 6A illustrates an example user interface for managing cross-premises resources through an integrated view according to embodiments.

FIG. 6A illustrates an example user interface for managing cross-premises resources through an integrated view according to embodiments. Diagram 600 displays an integrated view such as a single view providing management access to local and remote resources.

The single view displays a single control 602 as a common integration point to access views of local and remote resources separately. In an example scenario, clicking a local link may revert the application to display the local resource view. Alternatively, clicking the remote link may revert the application to display the remote resource view. The application may also display functionality through primary controls 604 including roles, mail flow, protection, voice, organization, etc. Of the primary controls 604, "Roles" may list user roles, "Mail" flow may display emails belonging to users, "Protection" may display privacy and access settings, "Voice" may display call history, and "Organization" may display organizational relationships of users.

The single view may also display customized controls 608 according to a user's access privileges. An example may include a settings menu or options menu provided according to the user's granted privileges such as read/write permissions and settings values. Furthermore, the application may provide additional functionality associated with the primary controls 604. Secondary controls 606 may provide access to mailboxes, groups, contacts, address lists, etc. associated with the primary controls 604. Additionally, the application may also provide search functionality through control 610 to search local and remote resources.

Figure 6B:
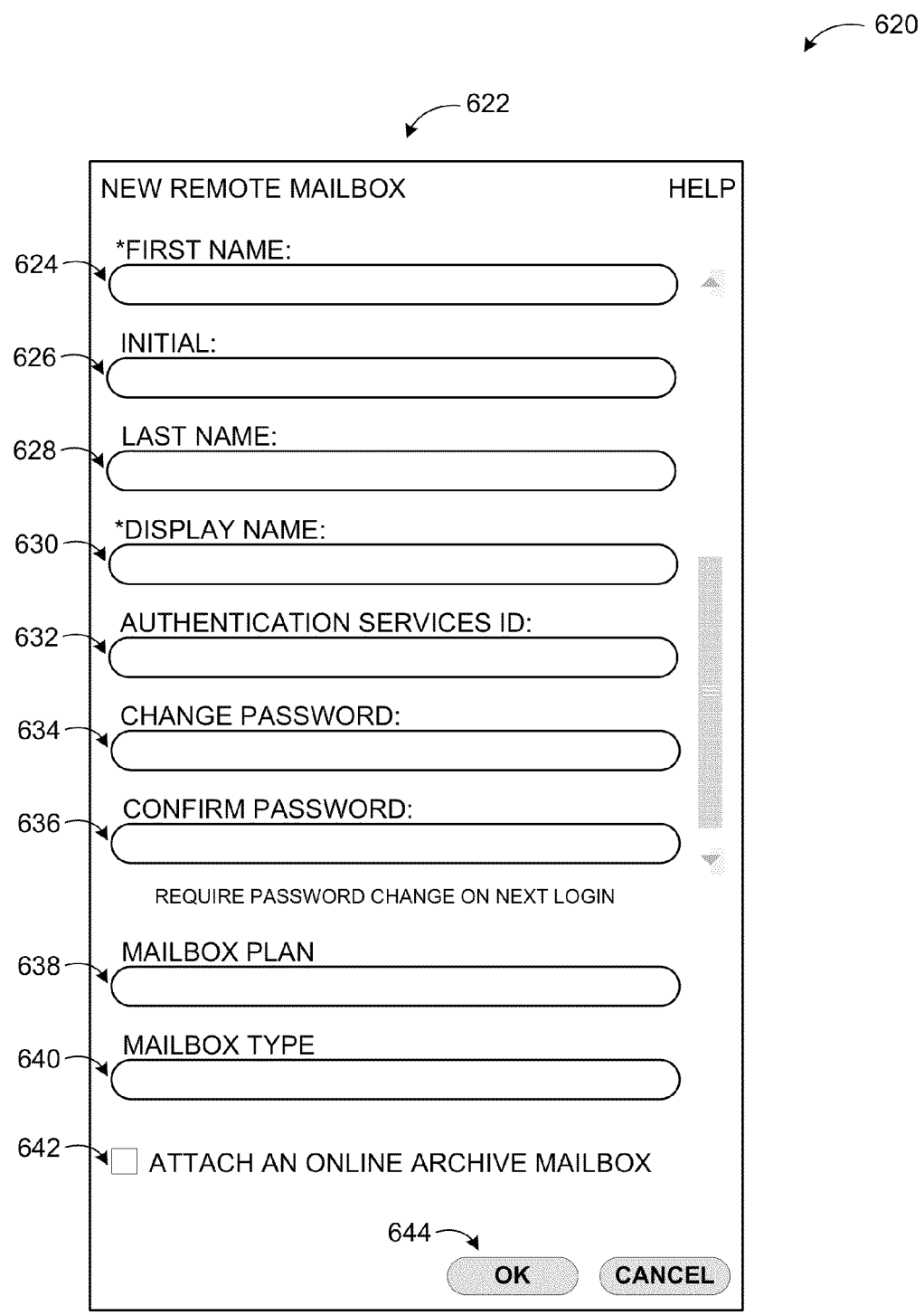
FIG. 6B illustrates a component of the user interface for managing cross-premises resources through an integrated view according to embodiments.

FIG. 6B illustrates a component of the user interface for managing cross-premises resources through an integrated view according to embodiments. Diagram 620 displays pane 622 to configure a remote resource.

The single view may be organized by the communication application to display a form to filled according to the remote resources requirements. The remote resource may be a new remote mailbox. The single view may ask a user to fill first name 624, initial 626, last name 628, display name 630, authentication services identification (ID) 632, change password value 634, and confirm password value 636. The user may be required to fill text boxes with '*' markers. The single view may also request the user to fill or select mailbox plan 638, mailbox type 640, and indicate whether to attach an online archive mailbox 642. The user may proceed according to selection of controls 644.

Figure 7:
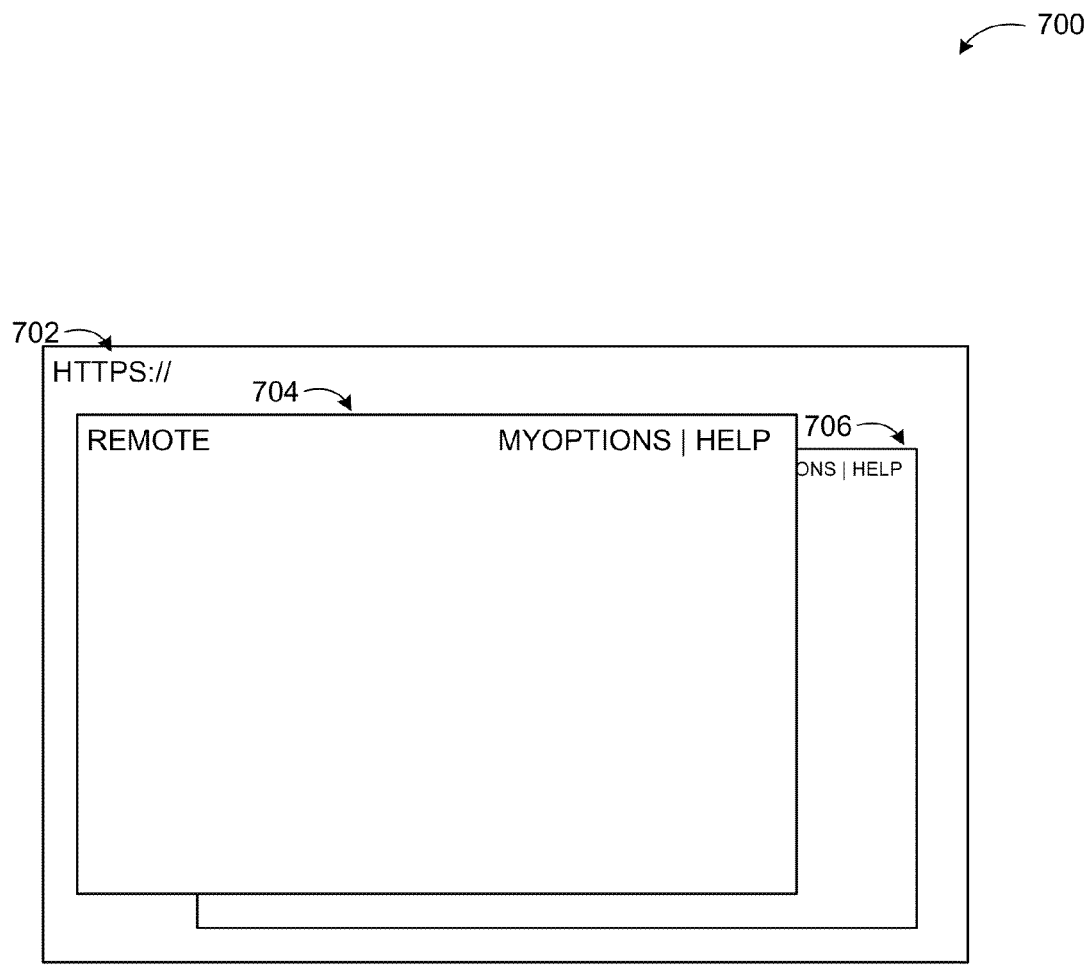
FIG. 7 illustrates another example user interface for managing cross-premises resources through an integrated view according to embodiments.

FIG. 7 illustrates another example user interface for managing cross-premises resources through an integrated view according to embodiments. Diagram 700 displays a single view 702 showing a remote resource pane 704. Alternatively, the user may also select to display a local resource pane 706 by clicking or activating the pane and bringing to the front of the communication application such as a browser.

According to embodiments, the application may present tools to manage the local and remote resources according to a default view. The application may determine the default view according to an administrator's authorization level. The application may integrate a local resource through a local iframe with a remote resource to generate the single view. Alternatively, the application may integrate a remote resource through a remote iframe with a local resource to generate the single view. Additionally, the application may embed the local and the remote resources in an iframe. The application may integrate the iframe into the single view. And, the application, may display the single view in a web browser.

The example scenarios and schemas in FIGS. 2 and 7 are shown with specific components, data types, and configurations. Embodiments are not limited to systems according to these example configurations. Managing cross-premises resources through an integrated view may be implemented in configurations employing fewer or additional components in applications and user interfaces. Furthermore, the example schema and components shown in FIGS. 2 and 7 and their subcomponents may be implemented in a similar manner with other values using the principles described herein.

Figure 8:
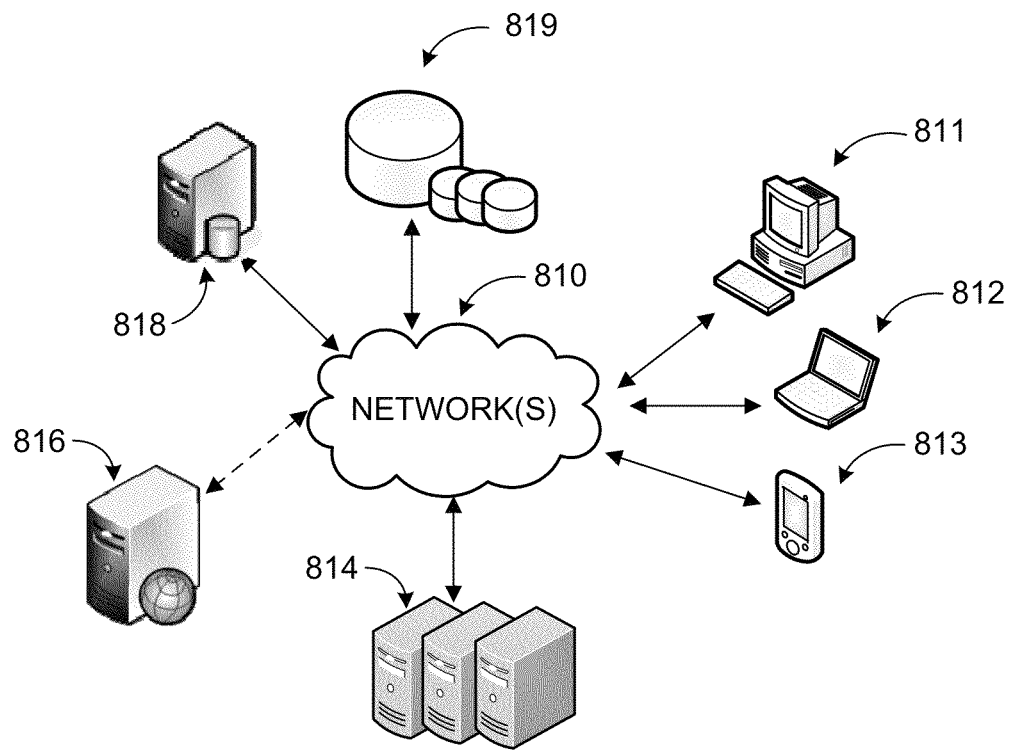
FIG. 8 is a networked environment, where a system according to embodiments may be implemented.

FIG. 8 is a networked environment, where a system according to embodiments may be implemented. Local and remote resources may be provided by one or more servers 814 or a single server (e.g. web server) 816 such as a hosted service. The communication application may communicate with client interfaces on individual computing devices such as a smart phone 813, a laptop computer 812, or desktop computer 811 ('client devices') through network(s) 810.

As discussed above, a communication application may manage cross-premises resources through an integrated view. A web browser may use iframes to format output/input from/into the local and remote resources.

Client devices 811-813 may enable access to applications executed on remote server(s) (e.g. one of servers 814) as discussed previously. The server(s) may retrieve or store relevant data from/to data store(s) 819 directly or through database server 818.

Network(s) 810 may comprise any topology of servers, clients, Internet service providers, and communication media. A system according to embodiments may have a static or dynamic topology. Network(s) 810 may include secure networks such as an enterprise network, an unsecure network such as a wireless open network, or the Internet. Network(s) 810 may also coordinate communication over other networks such as Public Switched Telephone Network (PSTN) or cellular networks. Furthermore, network(s) 810 may include short range wireless networks such as Bluetooth or similar ones. Network(s) 810 provide communication between the nodes described herein. By way of example, and not limitation, network(s) 810 may include wireless media such as acoustic, RF, infrared and other wireless media.

Many other configurations of computing devices, applications, data sources, and data distribution systems may be employed to manage cross-premises resources. Furthermore, the networked environments discussed in FIG. 8 are for illustration purposes only. Embodiments are not limited to the example applications, modules, or processes.

Figure 9:
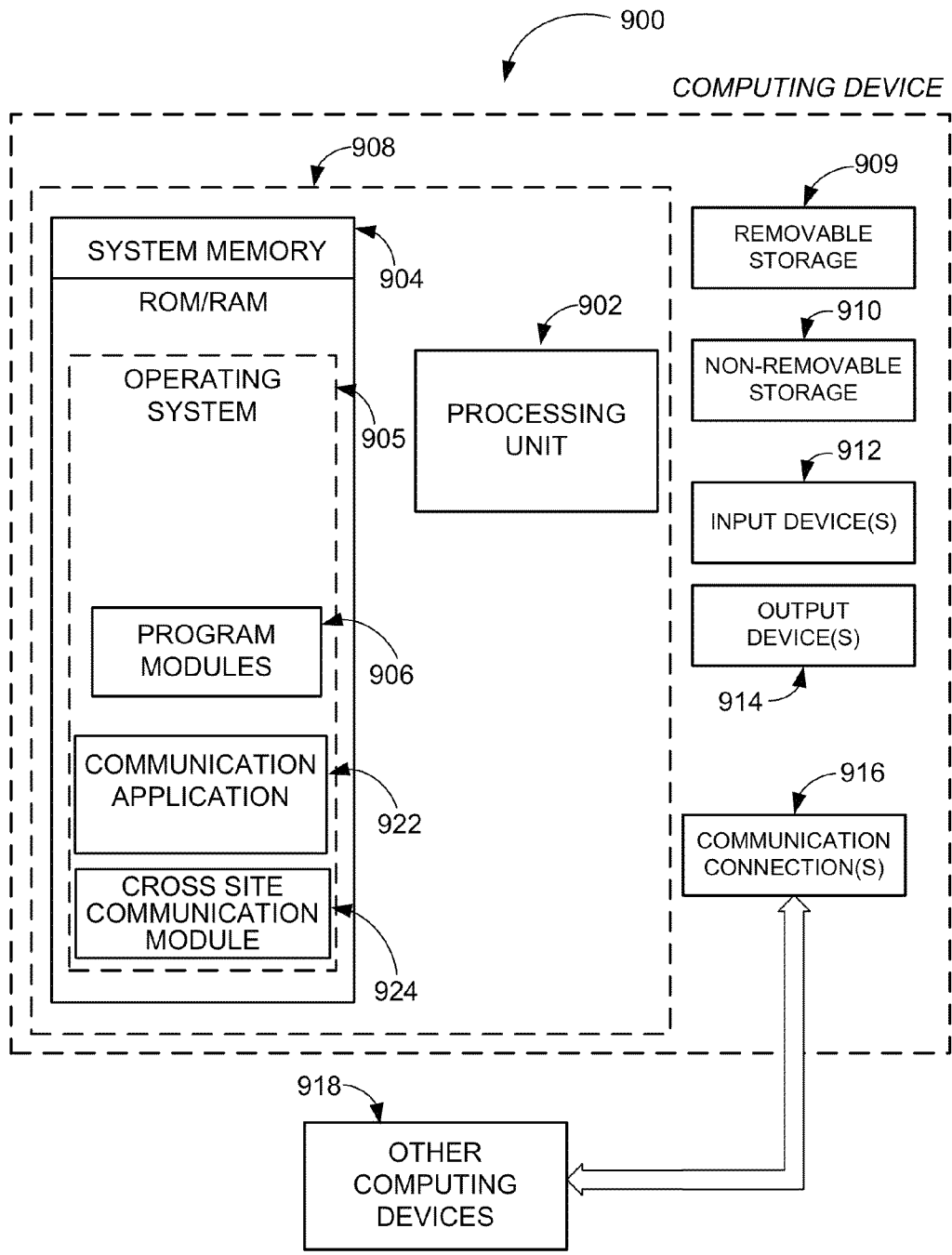
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment for an application according to embodiments is illustrated, such as computing device 900. In a basic configuration, computing device 900 may include at least one processing unit 902 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the platform, such as the WINDOWS® operating systems from MICROSOFT CORPORATION of Redmond, Wash. The system memory 904 may also include one or more software applications such as program modules 906, communication application 922, and cross-site communication module 924.

Communication application 922 may provide a single view according to embodiments. The cross-site communication module 924 may create and manage the single view. The cross-site communication module 924 may also authenticate a user into multiple resources. This basic configuration is illustrated in FIG. 9 by those components within dashed line 908.

Computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 904, removable storage 909 and non-removable storage 910 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer readable storage media may be part of computing device 900. Computing device 900 may also have input device(s) 912 such as keyboard, mouse, pen, voice input device, touch input device, and comparable input devices. Output device(s) 914 such as a display, speakers, printer, and other types of output devices may also be included. These devices are well known in the art and need not be discussed at length here.

Computing device 900 may also contain communication connections 916 that allow the device to communicate with other devices 918, such as over a wireless network in a distributed computing environment, a satellite link, a cellular link, and comparable mechanisms. Other devices 918 may include computer device(s) that execute communication applications, storage servers, and comparable devices. Communication connection(s) 916 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 10:
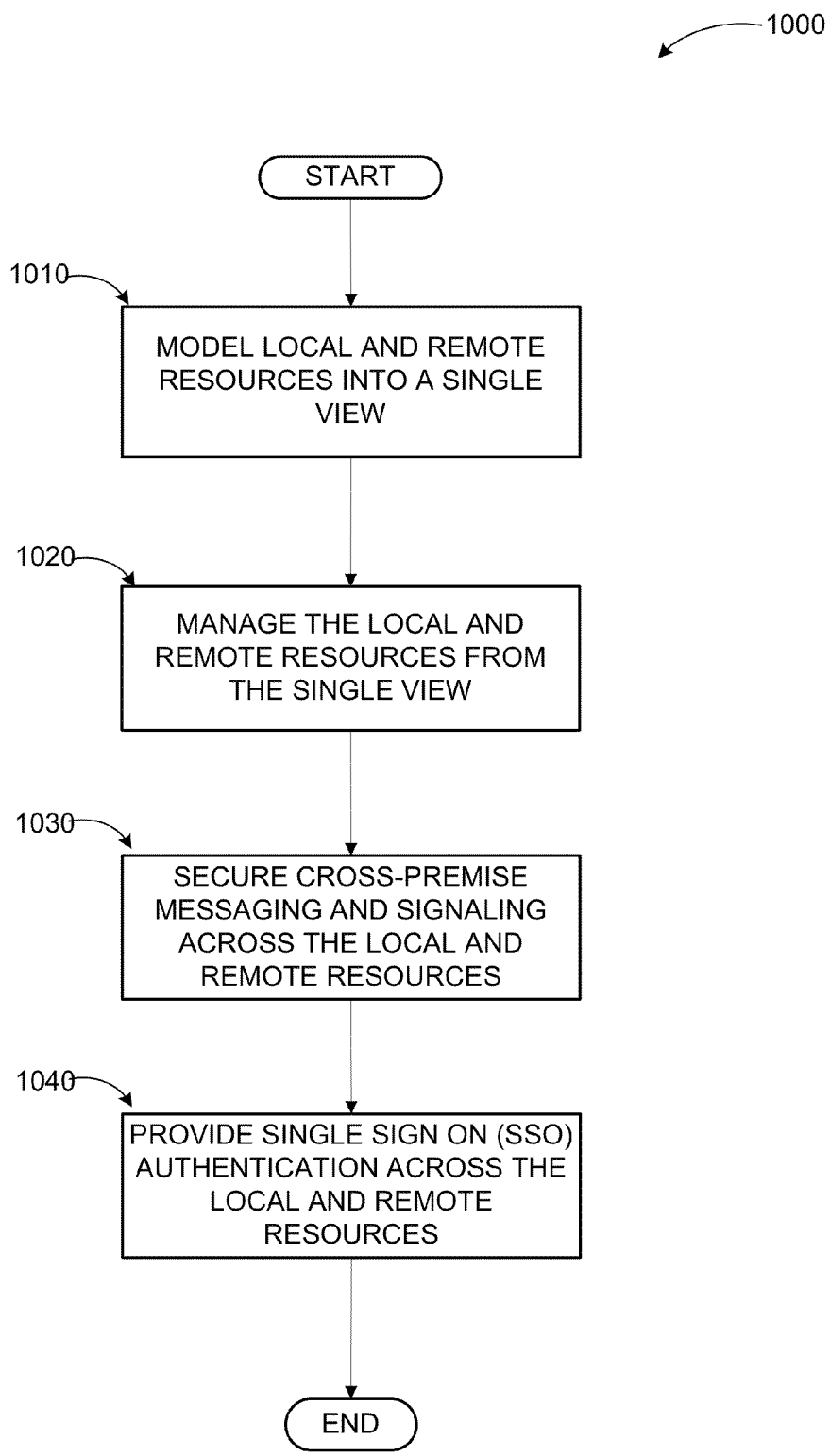
FIG. 10 illustrates a logic flow diagram for a process managing cross-premises resources through an integrated view according to embodiments.

FIG. 10 illustrates a logic flow diagram for a process managing cross-premises resources through an integrated view according to embodiments. Process 1000 may be implemented by a communication application in some examples.

Process 1000 may begin with operation 1010 where the application may model local and remote resources into a single view. The application may combine common controls such as name, last name, password, etc. input controls into the single view. At operation 1020, the application may manage the local and remote resources from the single view. The application may forward input from a user to corresponding local and remote resource. Alternatively, the application may display output from the local and remote resources on the single view. Next, the application may secure cross-premises messaging and signaling across the local and remote resources at operation 1030. The application may implement security and access settings as required by the resources and by organizational policies. Additionally, the application may provide single sign on (SSO) authentication across the local and remote resources at operation 1040. The application may authenticate a single user through single point of access for multiple platforms.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 1000 are for illustration purposes. Managing cross-premises resources through an integrated view may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for managing cross-premises resources, the method comprising:
    modeling at least one of a local resource and a remote resource into a single view;
    displaying a single control as a common integration point to access views of the at least one of the local resource and the remote resource, and one or more customized controls based on a user's access privileges through the single view;
    managing the at least one local resource and remote resource from the single view by:
        receiving user input through the single view for transmission as a message to the at least one local resource and remote resource,
        attempting to transmit the message to the at least one local resource and remote resource,
        determining whether a maximum number of retries has been reached for transmission of the message in response to a determination that a timeout has been reached before receiving an acknowledgment from the at least one local resource and remote resource following the attempted transmission of the message, and
        aborting the attempted transmission of the message in response to a determination that the maximum number of retries has been reached;
    securing cross-premises messaging and signaling across the at least one local resource and remote resource; and
    providing single sign on (SSO) authentication across at least a portion of the at least one local resource and remote resource.

2. The method of claim 1, wherein a local resource includes a unique view and a communication layer.

3. The method of claim 1, wherein a remote resource includes a unique view and a communication layer.

4. The method of claim 1, wherein the single view includes a plurality of integrated web pages from the at least one local resource and remote resource displayed in a browser window.

5. The method of claim 1, further comprising:
    employing a cross-site communication logic to support messaging and signaling across the at least one local resource and remote resource.

6. The method of claim 5, wherein the cross-site communication logic, in response to accepting a message parameter from a local resource, transmits the message parameter to an associated remote resource.

7. The method of claim 5, wherein the cross-site communication logic, in response to accepting a message parameter from a remote resource, transmits the message parameter to an associated local resource.

8. The method of claim 1, wherein managing the at least one local resource and remote resource from the single view further comprises:
    storing the message until detection of at least one from a set of: receipt of the acknowledgement from the at least one local resource and remote resource and a failed event notification indicating to abort the transmission of the message.

9. The method of claim 1, wherein providing the SSO further comprising:
    detecting a log in attempt in an at least one local resource;
    redirecting a log in attempt to authentication services; and
    transmitting the log in attempt to an at least one remote resource through the authentication services.

10. The method of claim 9, further comprising:
    detecting a request for locally authenticated users from the at least one remote resource; and transmitting the locally authenticated users to the at least one remote resource for duplicating authentication of the locally authenticated users at the at least one remote resource.

11. The method of claim 10, further comprising:
persisting the SSO in the at least one remote resource by saving information about the locally authenticated users at the remote resource.

12. A computing device for managing cross-premises resources, the computing device comprising:
a memory storing instructions; and
a processor coupled to the memory, the processor executing a communication application in conjunction with the instructions stored in the memory, wherein the communication application is adapted to:
model at least one of a local resource and a remote resource into a single view, wherein the single view is a browser window that displays a single control as a common integration point to access views of the at least one of the local resource and the remote resource, and one or more customized controls based on a user's access privileges;
manage the at least one local resource and remote resource from the single view by:
receiving user input through the single view for transmission as a message to the at least one local resource and remote resource,
attempting to transmit the message to the at least one local resource and remote resource,
determining whether a maximum number of retries has been reached for transmission of the message in response to a determination that a timeout has been reached before receiving an acknowledgment from the at least one local resource and remote resource following the attempted transmission of the message, and
aborting the attempted transmission of the message in response to a determination that the maximum number of retries has been reached;
secure cross-premises messaging and signaling across the at least one local resource and remote resource;
employ a cross-site communication logic to support messaging and signaling across the at least one local resource and remote resource; and
provide single sign on (SSO) authentication across at least a portion the at least one local resource and remote resource.

13. The computing device of claim 12, further adapted to:
present tools to manage the at least one local resource and remote resource according to a default view; and
determine the default view according to an administrator's authorization level.

14. The computing device of claim 13, further adapted to:
provide primary navigation controls including at least one from a set of: recipients, roles, mail flow, protection, voice, and organization to manage the at least one local resource and remote resource; and
provide secondary navigation controls to augment the primary navigation controls with additional functions and tools.

15. The computing device of claim 14, further adapted to:
provide a search control enabled to interact with the at least one local resource and remote resource.

16. A computer-readable memory device with instructions stored thereon for managing cross-premises resources, the instructions comprising:
modeling at least one of a local resource and a remote resource into a single view;
displaying a single control as a common integration point to access views of the at least one of the local resource and the remote resource, and one or more customized controls based on access privileges of a user through the single view;
managing the at least one local resource and remote resource from the single view by:
receiving user input through the single view for transmission as a message to the at least one local resource and remote resource,
attempting to transmit the message to the at least one local resource and remote resource,
determining whether a maximum number of retries has been reached for transmission of the message in response to a determination that a timeout has been reached before receiving an acknowledgment from the at least one local resource and remote resource following the attempted transmission of the message, and
aborting the attempted transmission of the message in response to a determination that the maximum number of retries has been reached;
presenting tools to manage the at least one local resource and remote resource according to a default view;
determining the default view according to an administrator's authorization level;
securing cross-premises messaging and signaling across the at least one local resource and remote resource;
employing a cross-site communication logic to support messaging and signaling across the at least one local resource and remote resource; and
providing single sign on (SSO) authentication across at least a portion the at least one local resource and remote resource.

17. The computer-readable memory device of claim 16, wherein the instructions further comprise:
integrating a local resource through a local iframe with a remote resource to generate the single view.

18. The computer-readable memory device of claim 16, wherein the instructions further comprise:
integrating a remote resource through a remote iframe with a local resource to generate the single view.

19. The computer-readable memory device of claim 16, wherein the instructions further comprise:
embedding at least one from the at least one local resource and remote resource in an iframe;
integrating the iframe into the single view; and
displaying the single view in a web browser.

* * * * *